US012651375B2

(12) United States Patent
Nusser et al.

(10) Patent No.: US 12,651,375 B2
(45) Date of Patent: Jun. 9, 2026

(54) METHOD AND DEVICE FOR MONITORING A FIELD OF VIEW OF A STATIONARY SENSOR

(71) Applicant: Robert Bosch GmbH, Stuttgart (DE)

(72) Inventors: Sebastian Nusser, Hildesheim (DE); Joachim Boerger, Friedrichshafen (DE); Matthias Ehm, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 363 days.

(21) Appl. No.: 18/348,792

(22) Filed: Jul. 7, 2023

(65) Prior Publication Data

US 2024/0020878 A1      Jan. 18, 2024

(30) Foreign Application Priority Data

Jul. 18, 2022    (DE) ...................... 10 2022 207 295.2

(51) Int. Cl.
*G06V 20/54*          (2022.01)
*G06T 7/73*           (2017.01)

(52) U.S. Cl.
CPC ................ *G06T 7/74* (2017.01); *G06V 20/54* (2022.01); *G06T 2207/10028* (2013.01); *G06T 2207/30236* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 11,068,713 B1 * | 7/2021 | Li ........................... | G06V 20/17 |
| 11,557,089 B1 * | 1/2023 | Choi ........................ | G08G 1/04 |
| 2012/0127017 A1 * | 5/2012 | Sasabuchi .............. | G01S 7/411 |
| | | | 342/70 |
| 2019/0236405 A1 * | 8/2019 | Dabeer .............. | G01C 21/3867 |
| 2020/0103920 A1 * | 4/2020 | Castorena Martinez .................... | |
| | | | G06T 7/74 |

(Continued)

FOREIGN PATENT DOCUMENTS

| | | | | | |
|---|---|---|---|---|---|
| CN | 109341650 A | * | 2/2019 | ............ | G01C 5/005 |
| DE | 102015105206 A1 | | 11/2015 | | |

(Continued)

*Primary Examiner* — Amandeep Saini
*Assistant Examiner* — Caroline Tabancay Duffy
(74) *Attorney, Agent, or Firm* — NORTON ROSE FULBRIGHT US LLP

(57) ABSTRACT

A method and a device for monitoring a field of view of a stationary sensor. The method includes: a first step for receiving recordings of surroundings of the sensor, which are generated at different times within a predefined measuring time frame with the aid of the sensor; a second step for ascertaining, based on the recordings, measuring points, which each represent positions and/or dimensions of objects in the surroundings of the sensor; a third step for grouping the ascertained measuring points based on a predefined similarity metric, where each group of measuring points is represented by a prototype; and a fourth step for ascertaining a change of content within the field of view of the sensor based on a comparison of the prototypes with a reference data set, which includes reference prototypes, whose underlying measuring points are ascertained in a reference state of the sensor and of the surroundings.

18 Claims, 2 Drawing Sheets

(56) References Cited

U.S. PATENT DOCUMENTS

| | | | | |
|---|---|---|---|---|
| 2020/0225321 | A1 | 7/2020 | Kruglick et al. | |
| 2020/0250971 | A1* | 8/2020 | Zhao | G08G 1/09675 |
| 2021/0042982 | A1* | 2/2021 | Trajkovic | G06T 15/00 |
| 2022/0114813 | A1* | 4/2022 | Jia | G06T 7/70 |

FOREIGN PATENT DOCUMENTS

| | | | | | |
|---|---|---|---|---|---|
| DE | 102015120659 | A1 | | 6/2017 | |
| DE | 102016015582 | A1 | | 7/2018 | |
| DE | 102019118481 | A1 * | 1/2021 | | G01S 17/89 |
| DE | 102020210749 | A1 | | 3/2022 | |
| EP | 2041599 | B1 | | 9/2010 | |

* cited by examiner

10 sensor

90 filter recordings

70

100 receive filtered recordings and store

200 ascertain measuring points

300 group ascertained measuring points

350 identify stationary prototypes

400 ascertain change of content

500 ascertain type and degree of difference

80 60 reference data set

20

40

40'

10    14    12

METHOD AND DEVICE FOR MONITORING A FIELD OF VIEW OF A STATIONARY SENSOR

CROSS REFERENCE

The present application claims the benefit under 35 U.S.C. § 119 of German Patent Application No. DE 10 2022 207 295.2 filed on Jul. 18, 2022, which is expressly incorporated herein by reference in its entirety.

BACKGROUND INFORMATION

The present invention relates to a method and a device for monitoring a field of view of a stationary sensor, in particular, a sensor for monitoring traffic infrastructure.

In the related art, stationary sensors, such as radar sensors, may be used for traffic control; such sensors being able to be provided with additional attitude sensors, in order to estimate an orientation of the sensor.

In order to be able to monitor a field of view of such a sensor reliably and, for example, to derive individual objects from measurement data of the sensor and locate them in the real world, the exact sensor attitude (spatial coordinates and respective angle of rotation) must be known. Due to environmental influences, it is possible for a sensor attitude to change gradually (e.g., due to loose mounting) or suddenly (e.g., due to a crash or a blow to the sensor attachment). A change in the sensor attitude leads inevitably to an altered field of view of the sensor, which results in an incorrect assessment of objects detected in the surroundings.

In order to detect such an unintentional change in a sensor attitude, the related art employs, for example, optical sensors, in order to monitor a position and/or orientation of one or more sensors mentioned above.

European Patent No. EP 20 41 599 B1 describes radar set-ups and associated methods for, in particular, traffic control. In this connection, a use of an FMCW radar as, in particular, a traffic detector having a digitally controlled ramp is proposed. Both static and moving objects may be detected by detection methods of the present invention, using narrow-band FMCW or Doppler radar, as well. In both cases, the current measuring signal differs from a stored dummy signal.

German Patent Application No. DE 10 2016 015582 A1 describes a system and method for traffic control; the system including a plurality of permanently installed, stationary base units and at least one monitoring unit for acquiring data regarding monitored traffic; the monitoring unit being able to be detachably fastened to a selected base unit temporarily; and alignment devices being positioned on the monitoring unit and/or the base unit; automatic alignment of the monitoring unit with the region to be monitored being accomplished by the alignment devices.

SUMMARY

According to a first aspect of the present invention, a method for monitoring a field of view of a stationary sensor is provided.

In a first step of the method of an example embodiment of the present invention, a plurality of recordings (also called frames) of surroundings of the sensor are received, which are generated by the sensor at different times within a predefined measuring time frame. Each recording advantageously represents, in each instance, the region of the surroundings of the sensor, which is covered by a field of view of the sensor; subregions of the field of view of the sensor also being usable.

During the generation of the respective recordings, it is possible for the utilized field of view of the sensor to be covered simultaneously or successively. The latter occurs, for example, in the use of a sensor, which scans the surroundings successively with the aid of an emitted measuring signal in unison with a predefined scanning motion (e.g., a point or a line scanner).

The plurality of recordings is received, for example, in an evaluation unit, which is a part of the sensor or a component situated outside of the sensor; the evaluation unit taking the form of, for example, an ASIC, FPGA, processor, digital signal processor, microcontroller, or the like, and being advantageously configured to execute a portion or all of the steps of the method according to the present invention. The recordings, which are received in the evaluation unit and/or in a component differing from it and are generated within the measuring time frame, are preferably stored temporarily in a storage unit connected to the evaluation unit in a manner allowing the transmission of data.

It should be pointed out that the measuring time frame is advantageously a measuring time frame of a plurality of temporally consecutive measuring time frames, which means that the monitoring of the field of view of the sensor may be carried out repeatedly over a longer time frame. In this connection, it is possible for the individual measuring time frames to be directly contiguous in time, to overlap temporally, or to be set apart temporally from each other. It is particularly advantageous for the specific measuring time frames to be extracted from an ongoing stream of consecutive recordings with the aid of a sliding measuring window, whose size corresponds to a single measuring time frame (e.g., a length of a few seconds, specifically, e.g., 5 s). In addition, it is possible for a duration of the measuring time frame to be adjusted dynamically as a function of predefined boundary conditions.

In a second step of the method according to an example embodiment of the present invention, measuring points are ascertained, which each represent positions and/or dimensions of objects or subregions of objects in the surroundings of the sensor, based on the recordings. It is emphasized that this may be carried out already as a function of a use of a specific sensor type and/or a design of the specific sensor during the generation of the recordings of the surroundings by the sensor, which means that the recordings received by the sensor already contain the measuring points representing the surroundings (e.g., in the form of a 3-D point cloud). Alternatively, it is also possible for the sensor to supply raw data and/or preprocessed raw data, on the basis of which the measuring points are ascertained.

In a third step of the method according to the present invention, the ascertained measuring points are grouped on the basis of a predefined similarity metric; each group (also called a cluster or aggregate) of measuring points being represented by a prototype. The grouping may be accomplished both within a single recording and across recordings, which means that not only spatial relationships of measuring points, but also temporal relationships of measuring points may be taken into account in the grouping.

It should be pointed out that the specific prototypes, which represent respective groups, preferably each constitute an individual measuring point, which may be regarded as a representative for the measuring points of a specific group.

Such a representative measuring point may be a measuring point of the group itself or a newly generated measuring point for the group. The representative measuring point is, for example, a measuring point, which defines a center of mass of the individual measuring points of a specific group, without being limited to such a criterion for determining the representative measuring point. In addition, it is possible for a specific prototype to include a plurality or all of the measuring points of a respective group and, thus, to describe, for example, the distribution of the specific group in more detail.

It is emphasized that as an alternative to, or in addition to, a position information item, a prototype may also include further features describing a group, such as a variance and/or a density of corresponding measuring points, etc.

In a fourth step of the method according an example embodiment of the present invention, a change of content within the field of view of the sensor is ascertained on the basis of a comparison of the prototypes, which may also be referred to as test data, with a reference data set, which includes reference prototypes, whose underlying measuring points are ascertained in a reference state of the sensor and of the surroundings. For example, a state of a sensor aligned according to nominal requirements and/or a state of a calibrated sensor may be regarded as a reference state.

In general, it is emphasized that different methods may additionally be used for cleaning and/or filtering the data, which represent the recordings of the sensor (in particular, in the course of preprocessing), in order to increase, for example, a robustness of the method according to the present invention, and/or in order to eliminate processing of irrelevant data, etc. The latter offers, inter alia, the option of using smaller storage capacities for the intermediate storage of the data and/or processing units having lower capacity, through which, for example, costs may be reduced.

In addition, in the course of preprocessing of the data of the sensor, it is possible for measuring point data supplied in polar coordinates to be converted to cartesian coordinates, or vice versa, and/or for implausible measured values and/or highly noisy measured values to be discarded.

The method of the present invention generally provides the advantage, that changes in content of the field of view of the sensor are automatically detected, through which, inter alia, a reliability of monitoring of the surroundings by the sensor may be improved on the basis of the method according to the present invention. In particular, in the case of use of the method in the context of traffic control or similar areas of application, the improved reliability may also increase the safety of road users, who use surrounding-area data acquired by the sensor, directly and/or indirectly.

Preferred further refinements of the present invention are disclosed herein.

In one advantageous refinement of the present invention, the sensor is a sensor for monitoring traffic infrastructure. As such, the sensor is positioned, for example, in the region of a traffic intersection, etc., in order to control a traffic guidance system on the basis of surrounding-area data acquired by the sensor, and/or to supply vehicles traveling autonomously and/or semiautonomously with data, which render operation of these vehicles more reliable and/or safer. The sensor is, for example, a radar sensor (e.g., a 4-D and/or an imaging radar) and/or an ultrasonic sensor and/or a lidar sensor and/or a camera. In addition, similarities of spatial coordinates and/or velocities and/or dimensions (e.g., radar cross sections of surfaces) of respective measuring points are advantageously determined with the aid of the similarity metric utilized. In other words, in this manner, the individual measuring points may be combined particularly advantageously into respective groups in such a manner, that these have a spatial proximity to each other (e.g., spatial coordinates, which do not exceed a predefined distance in space from each other), which means that the probability of them being associated with one and the same object in the surroundings of the sensor is high. In a similar manner, the probability that measuring points, which have, alternatively or additionally, a similar velocity of objects and/or object regions, are to be associated with one and the same object, is high. This also applies, for example, to similar radar cross sections in similar regions of the surroundings, etc.

It is particularly advantageous for an example embodiment of the method of the present invention to include a step for identifying stationary prototypes within the entirety of prototypes; stationary prototypes being characterized in that their respective underlying measuring points represent substantially stationary objects in the surroundings of the sensor; and the identified stationary prototypes being taken exclusively into account in the fourth step of the method for ascertaining the change in content within the field of view of the sensor. Inter alia, in connection with later-described monitoring of an attitude of the sensor on the basis of the method of the present invention, this provides the advantage that moving objects, such as passing vehicles, etc. in the field of view, are excluded from further processing, since these usually do not provide a positive contribution in connection with an intended use of the present invention.

Stationary prototypes described above are preferably identified by linking measuring points underlying a specific prototype to velocity data, which represent, in each instance, velocities that are below a predefined, first velocity threshold. Such velocity data are already acquired and made available by the sensor itself as a function of the type and embodiment of the sensor used. This is accomplished, for example, using the Doppler effect in connection with a radar sensor and/or ultrasonic sensor and/or a sensor differing from them. Alternatively, or in addition, it is possible to ascertain such velocity data from video images or recordings differing from them. Such filtering, by which, in essence, only stationary measuring points are retained for further processing, may already be carried out early within the processing chain, as a function of the specific form of sensor, which means that required storage and/or computing power for the processing of nonstationary measuring points may be eliminated. As a further alternative, or in addition, it is possible to identify stationary prototypes in that a prototype, which corresponds to a specific prototype that is present at least in the first recording within the measuring time frame, is present in at least the last recording within the measuring time frame; the corresponding prototype being characterized in that it represents the same stationary object as the prototype from the first recording. In other words, a prototype may be regarded as a stationary prototype, if, at least at the beginning and at the end of the respective measuring time frame, it is present within the recordings at a substantially identical position and/or in a similar form (e.g., similar size, shape, reflection characteristic, etc.). In addition to the option of being able to distinguish moving objects from nonmoving, that is, stationary, objects within the measuring time frame, this procedure provides the particular advantage that stationary objects in the surroundings, which are briefly concealed or partially concealed by moving objects within the measuring time frame, are also retained for further processing. Alternatively, or in addition, the stationary prototypes are identified, in particular, in that both a measuring point in at least the first recording within the measuring time frame, where the measuring point belongs to the group of a specific prototype, and a further measuring point in at least the last recording within the measuring time frame, where the further measuring point belongs to the group of the prototype, are present for the specific prototype. This allows the probability of the same stationary object's being identified to be high. It should be pointed out that for this, the number of recordings to be viewed at the start of the measuring time frame and at the end of the measuring time frame may correspond, for example, to two, three or more; and that the number of recordings to be viewed at the start of the measuring time frame and the number of recordings to be viewed at the end of the measuring time frame may differ from each other. In addition, it is possible to adjust the respective number as a function of current boundary conditions. Of course, the data, which is in regard to moving objects present in the recordings and may be advantageously dispensed with for the method of the present invention, may be used simultaneously for identifying the surroundings of objects, in order to ascertain, for example, the traffic load of a road, etc.

In one further advantageous embodiment of the present invention, a difference of an actual attitude of the sensor (that is, an actual position and an actual orientation, e.g., in three-dimensional space) from a setpoint attitude of the sensor predefined by the reference data set, is ascertained on the basis of the determination of the change in content within the field of view of the sensor. In this manner, it may be ensured that instances of linear displacement and/or rotation of the sensor with respect to surroundings to be monitored are detected automatically with the aid of the method according to the present invention, which means that a reliability of monitoring of the surroundings by the sensor is increased. Alternatively, or in addition, it is possible to ascertain a change of objects in the surroundings of the sensor on the basis of the determination of the change in content within the field of view of the sensor; this ascertainment preferably being limited to quasi-stationary objects. Quasi-stationary objects are to be understood as objects, which are immobile over a predefined minimum time frame. For example, safety beacons, etc., which are provided at construction sites, remain unchanged over a correspondingly longer time frame, and are therefore suitable, for example, for ascertaining a difference of an actual attitude of the sensor from a setpoint attitude of the sensor, as well, come into consideration as such objects. As a further alternative, or in addition, on the basis of the determination of the change in content within the field of view of the sensor, it is possible to ascertain and use a correction value to compensate for the difference of the actual attitude from the setpoint attitude of the sensor and/or to output an information item representing the change in content within the field of view. The latter may be used, for example, to inform a service technician automatically about such a difference, so that the attitude of the sensor may be corrected on the spot by the service technician. Alternatively, or in addition, the ascertained information item may be used, for example, to deactivate monitoring of the surroundings by the sensor and/or to initiate a recalibration of the sensor.

During the execution of the method according to an example embodiment of the present invention, a transformation rule is preferably determined, which maps the ascertained (preferably stationary) prototypes to corresponding reference prototypes of the reference data set. For example, a method of point registration from the related art, such as the iterative closest points algorithm (ICP) or normal distributions transform (NDT), may be used for this. Alternatively, a similarity function between two sets of points may be used. Subsequently, a type (e.g., a translational and/or a rotational) and/or a degree of a difference of the actual attitude of the sensor from the setpoint attitude of the sensor is ascertained on the basis of the transformation rule. For example, the inverse of the transformation rule is used for this, in order to determine, on this basis, the maximum difference of the individual prototypes from the corresponding reference prototypes, in order to determine a maximum positioning and/or attitude error of the sensor.

In a further advantageous embodiment of the present invention, the difference of the actual attitude from the setpoint attitude of the sensor is ascertained on the basis of a statistical comparison method, where a distribution of differences between corresponding prototypes and reference prototypes (within a recording and/or between specific recordings) is compared to a predefined reference distribution. Alternatively, or in addition, it is possible to ascertain a difference of the actual attitude of the sensor from the setpoint attitude of the sensor on the basis of low-pass filtering of a plurality of jointly viewed difference values (within a recording and/or between recordings) between corresponding prototypes and reference prototypes, and on the basis of a comparison of the filtered difference values with at least one predefined threshold difference value. Using the two methods described above, individual, excessive and/or erroneous differences between prototypes and reference prototypes, which may be caused, for example, due to disruptive influences such as noise and/or false detections, etc., do not produce unintentional corruption and/or distortion during the determination of the actual difference of the actual attitude from the setpoint attitude. In other words, in this manner, particularly robust monitoring of an actual attitude of the sensor may be achieved, since an influence of individual outlier values on an overall result of a determination is advantageously reduced.

During the determination of the measuring points, it is further preferable for only the data, which represent the recordings and satisfy predefined quality criteria (which include, e.g., low noise and/or high accompanying confidence values, etc.), to be considered. Alternatively or additionally, in the method of the present invention, only such measuring points are considered, which are linked to velocity data that each represent velocities lying below a predefined, second velocity threshold.

In one further advantageous embodiment of the present invention, the reference data set is generated on the basis of the monitoring of the surroundings by the sensor in a predefined, in particular, in a calibrated, state (that is, in a setpoint state) of the sensor, and/or on the basis of a simulation of the surroundings (that is, on the basis of a traffic simulation), and/or on the basis of map data, and/or on the basis of a sensor model. With the aid of a simulation of the sensor and/or a simulation of the positioning of the sensor in surroundings, for example, an optimal attitude of the sensor may be ascertained in advance, which is subsequently used in the actual installation of the sensor in the actual surroundings as a positioning and alignment requirement for the sensor. In addition, as described above, it is possible to generate the reference data set exclusively or additionally on the basis of simulation data. In addition, it is possible to generate the reference data set prior to the execution of the method according to the present invention (e.g., on the basis of a relatively long measuring time frame of, for example, 10 min to 30 min, in order to minimize disruptive influences such as noise) or during the execution of the method on the basis of temporarily stored and/or preprocessed raw data of the sensor. In the latter case, for example, recording data from one or more previous runthroughs of the method of the present invention may be used as a basis for the generation of the reference data set, from which it is known that they represent a setpoint state of the sensor. In other words, the reference data are preferably generated through the execution of steps of the method according to the present invention, as well; certain parameters, such as the establishment of the measuring time frame between a training phase for ascertaining the reference data set and an execution phase for ascertaining a difference in contents within the field of view of the sensor, being able to differ. Alternatively, or in addition, the reference data set may be used as described above, in order to adjust an initial attitude of the sensor.

According to a second aspect of the present invention, a device for monitoring a field of view of a sensor is provided; the device being, for example, a part of the sensor itself and/or a component situated away from the sensor. According to an example embodiment of the present invention, using, for example, an evaluation unit, the device is configured to receive a plurality of recordings of surroundings of the sensor, which are generated with the aid of the sensor at different times within a predefined measuring time frame; configured to ascertain measuring points on the basis of recordings, which each represent positions and/or dimensions of objects in the surroundings of the sensor; configured to group the ascertained measuring points on the basis of a predefined similarity metric, where each group of measuring points is represented by a prototype; and configured to ascertain a change in content within a field of view of the sensor on the basis of a comparison of the prototypes with a reference data set, where the reference data set includes reference prototypes, whose underlying measuring points are ascertained in a reference state of the sensor and of the surroundings. The features, combinations of features, as well as the advantages produced by them, correspond, in such an obvious manner, to the ones explained in connection with the first-mentioned aspect of the present invention, that reference is made to the explanations above in order to avoid repetition.

According to a third aspect of the present invention, a computer program product is provided, which is configured to execute a method in accordance with the description above. According to a fourth aspect of the present invention, a machine-readable storage medium is provided, in which the computer program product mentioned above is stored.

BRIEF DESCRIPTION OF THE DRAWINGS

In the following, exemplary embodiments of the present invention are described in detail with reference to the figures.

DETAILED DESCRIPTION OF EXAMPLE EMBODIMENTS

Figure 1:
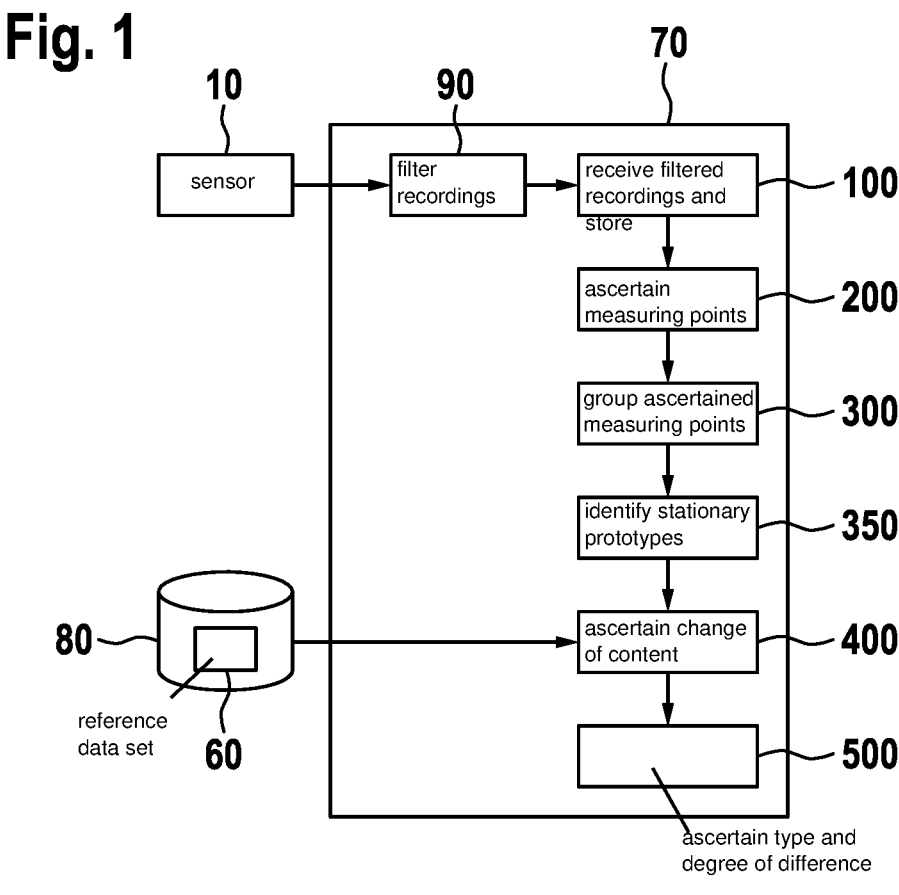
FIG. 1 shows a flow chart illustrating examples of method steps of a method according to the present invention.

FIG. 1 shows a flow chart illustrating examples of method steps of a method of the present invention for monitoring a field of view 12 of a stationary sensor 10, which takes the form, here, of a radar sensor for monitoring traffic infrastructure.

In a preprocessing step 90 of the method according to the present invention, a plurality of recordings of surroundings of sensor 10, which are generated at different times within a predefined measuring time frame with the aid of sensor 10, are received by an evaluation unit 70, which is connected to sensor 10 in a manner allowing the transmission of data. In this case, for example, the measuring time frame has a duration of 4 s, and a number of recordings per second is 15. In addition, the measuring time frame is a sliding time frame, which is advanced over an ongoing sequence of recordings of sensor 10 with a predefined step width of, for example, 0.5 s, within the sequence of individual recordings. For each measuring time frame, the method steps described here are repeated accordingly.

In preprocessing step 90, data, which represent the recordings, are filtered, in order to remove, for example, implausible data and/or noisy data and/or data not required for the method.

In one step 100 of the method of the present invention, the recording data filtered in step 90 are received by a main processing algorithm of evaluation unit 70 and stored in an internal storage unit 70 of evaluation unit 70.

In a step 200 of the method according to the present invention, measuring points, which each represent positions and/or dimensions of objects in the surroundings of the sensor, are ascertained on the basis of the recording data. Since, on the basis of the measurements of the surroundings, the radar sensor used here already supplies, itself, the measuring points representing the surroundings and confidence values respectively linked to them, in this case, the determination of the measuring points relates to extraction of the measuring point data from the recording data provided by the sensor. In a case, in which the sensor 10 itself is, for example, unable to ascertain the measuring point data from the measurements of the surroundings, this operation accordingly takes place in the present step 200.

Figure 3:
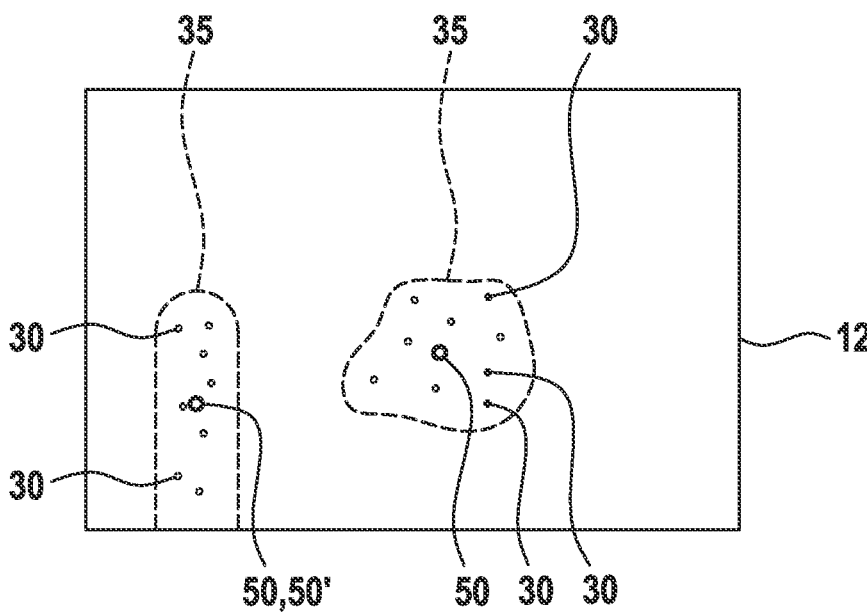
FIG. 3 shows an example of identified measuring points and groups of measuring points within a field of view of a sensor according to the present invention.

In a subsequent step 300, the ascertained measuring points are grouped on the basis of a predefined similarity metric; each group 35 (cf. FIG. 3) of measuring points being represented by a prototype 50 (cf. FIG. 3). The similarity metric used here defines maximum distances between specific measuring points in three-dimensional space, which must be adhered to, in order to combine individual measuring points to form a respective group. In addition, velocity data are evaluated, which are supplied by sensor 10 for each measuring point, in order to render the grouping of measuring points additionally dependent on whether they each have similar velocity data. Further measured variables of the sensor (for example, color information for optical sensors) and/or values derived from measured variables (for example, standard deviations of a particular measured variable) may be incorporated in the similarity metric, as well.

In each instance, a point, which constitutes, for example, a geometric center of mass for all of the measuring points of a specific group, is ascertained as a prototype for each group.

In a step 350, stationary prototypes are identified within the ascertained prototypes; stationary prototypes being characterized in that their respective underlying measuring points represent substantially stationary objects in the surroundings of the sensor. The stationary prototypes are identified in that a prototype, which corresponds to a specific prototype that is present in the first recording within the measuring time frame, is present in the last recording within the measuring time frame; the corresponding prototype being characterized in that it represents the same stationary object as the prototype from the first recording.

Alternatively, or in addition, the stationary prototypes are identified in that both a measuring point in at least the first recording within the measuring time frame, where the measuring point belongs to the group of the prototype, and a further measuring point in at least the last recording within the measuring time frame, where the further measuring point belongs to the group of the prototype, are present for the specific prototype. This allows the probability of the same stationary object's being identified to be high.

In this case, whether the prototypes to be considered each represent the same stationary object, is ascertained, for example, on the basis of an analysis of the position of the respective prototypes in three-dimensional space. In other words, if the prototypes to be considered do not exceed a maximum allowable positional difference with respect to each other, it is assumed that they represent the same object, and that the prototypes are stationary prototypes.

In a step 400, a change of content within the field of view of sensor 10 is ascertained on the basis of a comparison of stationary prototypes 50 with a reference data set 60, which includes reference prototypes, whose underlying measuring points are ascertained in a reference state of sensor 10 and of the surroundings. Here, reference data set 60 is stored in an external storage unit 80, which is connected to evaluation unit 70 so as to enable the transmission of data.

The changes in content are ascertained on the basis of a transformation rule, which maps the ascertained prototypes onto corresponding reference prototypes of the reference data set. A method of point registration from the related art is used for this.

In a step 500, a type (translational and/or rotational) and a degree of a difference of an actual attitude of sensor 10 from a setpoint attitude of sensor 10 is ascertained on the basis of the transformation rule. The values of this transformation rule $\hat{\Phi}$ may be used as a metric for detection of a change in content. In addition, it is possible to apply the inverse of the transformation rule $\hat{\Phi}^{-1}$ to the reference prototypes. In this connection, the maximum difference of a reference prototype $r_i$ from its corresponding transformed point $\hat{\Phi}^{-1}(r_i)$ is used as an estimate of the degree of the discovered transformation.

$$\max_i \left| r_i - \hat{\Phi}^{-1}(r_i) \right|$$

$$\max_i \left| r_i - \hat{\Phi}^{-1}(r_i) \right|$$

In order to increase a robustness of the method, the differences are ascertained, using a statistical comparison method (e.g., with the aid of the conventional Kolmogorov-Smirnov test), in which, assuming that there is no change in content of the field of view of sensor 10, a distribution of metric values is compared to the current distribution of metric values for sensor 10. In this manner, it is ensured that individual, in particular, markedly variant difference values and/or metric values caused by errors, remain unconsidered during the determination of the actual differences.

Based on the ascertained differences, suitable correction values may then be determined, in order to compensate for specific differences of the sensor attitude automatically. In a case, in which the specific differences are overly high for automatic compensation and are exceeded in the predefined threshold values of the differences, it is possible, for example, to inform a service technician automatically by text message, etc., that the actual attitude of sensor 10 must be corrected manually.

Figure 2:
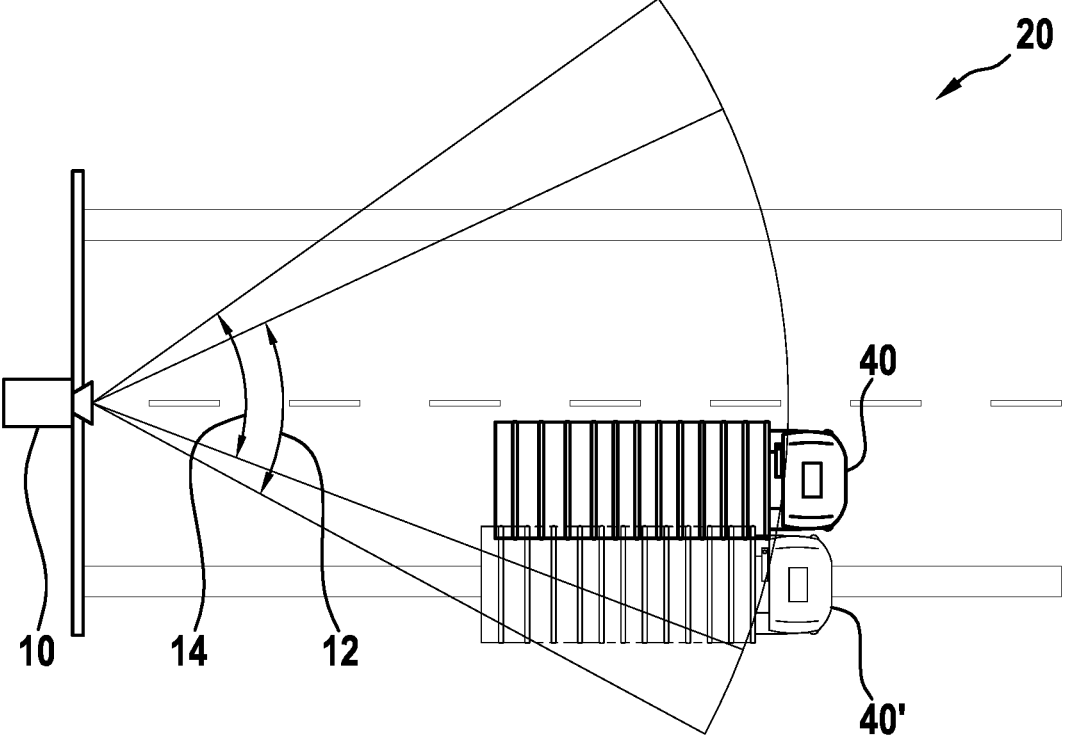
FIG. 2 shows a view of a sensor of the present invention, in conjunction with surroundings to be monitored by the sensor.

FIG. 2 shows a view of a sensor 10 of the present invention in conjunction with surroundings 20 to be monitored by sensor 10.

In this case, sensor 10 takes the form of a lidar sensor and is positioned on an overhead sign of an expressway. An orientation of a setpoint field of view 12 of sensor 10 in surroundings 20 of sensor 10 ensures that vehicles 40 traveling on the expressway are detectable for traffic control.

In the case of an error shown here, sensor 10 has a rotational difference with regard to setpoint field of view 12 (which corresponds to a setpoint attitude of sensor 10), which is characterized by an actual field of view 14.

Due to the rotational difference, an erroneous image of surroundings 20 is produced without use of the method of the present invention and without a correction of the difference, which means that vehicle 40 is located at a position of vehicle 40'. By using the method of the present invention, such a difference may be detected and corrected accordingly.

FIG. 3 shows an example of identified measuring points 30 and groups 35 of measuring points 30 within a field of view 12 of a sensor 10 according to the present invention.

It is apparent that the measuring points 30 ascertained by sensor 10 within field of view 12 have been grouped on the basis of similar positions within field of view 12.

In addition, for each group 35, a prototype is shown, which was ascertained, in each instance, as a geometric center of mass of the individual measuring points 30 of a group 35.

Furthermore, a velocity information item regarding the respective measuring points and/or regarding prototypes 50 was evaluated, so that one of prototypes 50 was identified as a stationary prototype 50'.

Figure 4:
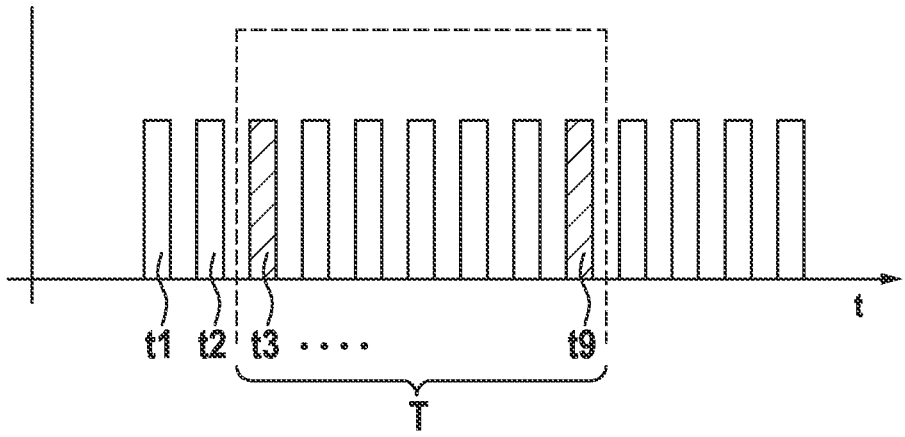
FIG. 4 shows an example of a measuring time frame to be evaluated in accordance with the present invention.

FIG. 4 shows an example of a measuring time frame T to be evaluated in accordance with the present invention.

Specific measuring times tn (t1, t2, t3, . . . , t9), which each represent times, at which recordings of surroundings of the sensor are generated with the aid of a sensor of the present invention, are shown symbolically on a time axis shown in FIG. 4.

Measuring time frame T is to be regarded as a measuring window, which is shifted successively over the plurality of recordings.

In addition, the first recording within measuring time frame T, which is captured at time t1, and the last recording within measuring time frame T, which is captured at time t9, are indicated by hatching, since these two recordings are used to identify stationary objects withing measuring time frame T in accordance with the description above.

What is claimed is:

1. A method performed by a stationary sensor system, the stationary sensor system including a stationary sensor and a processing system that includes at least one processor, the method being for self-monitoring a field of view of the stationary sensor while performing traffic control, the method comprising the following steps:

recording, by the stationary sensor, surroundings of the sensor, at plurality of different times within a predefined measuring time frame;

ascertaining, by the processing system and based on the recordings, measuring points representing positions and/or dimensions of objects in the surroundings of the sensor;

grouping, by the processing system, the ascertained measuring points based on a predefined similarity metric so that each group of the measuring points is represented by a prototype identifying a respective object to which the respective group of the measuring points corresponds;

filtering out, by the processing system, moving objects to thereby retain a subset of the prototypes representing those of the objects that are stationary in the surroundings;

determining, by the processing system, a transform that best fits the subset of prototypes to a stored reference set of reference prototypes that identify positions of stationary objects in a reference state of the sensor and surroundings and whose measuring points were ascertained in the reference state:

individually for each of the reference prototypes:

applying, by the processing system, an inverse of the transform individually to the respective reference prototype; and determining, by the processing system, a respective positional change of the respective reference prototype resulting from the inverse transform;

ascertaining, by the processing system and based on the positional changes, that a change has occurred to the field of view of the sensor and/or to an environment that is within the field of the view of the sensor, and performing, by the processing system, a control of vehicular traffic in real time based on the ascertained change while the stationary sensor continues to monitor the surroundings.

2. The method as recited in claim 1, wherein:

the sensor is a radar sensor and/or an ultrasonic sensor and/or a lidar sensor and/or a camera.

3. The method as recited in claim 1, wherein the subset of the prototypes are identified in that:

measuring points underlying a specific prototype are linked to velocity data, which each represent velocities that are below a predefined, first velocity threshold; and/or each prototype, which corresponds to a specific prototype that is present at least in the first recording within the measuring time frame, is present in at least the last recording within the measuring time frame, where the corresponding prototype is characterized in that it represents the same stationary object as the prototype from the first recording; and/or both a measuring point in at least the first recording within the measuring time frame, where the measuring point belongs to the group of the prototype, and a further measuring point in at least the last recording within the measuring time frame, where the further measuring point belongs to the group of the prototype, are present for the specific prototype.

4. The method as recited in claim 1, wherein based on the ascertainment that the change has occurred to the field of view of the sensor and/or to the environment:

a difference of an actual attitude of the sensor from a setpoint attitude of the sensor predefined by the reference set is ascertained; and/or a change of objects in the surroundings of the sensor is ascertained; and/or a correction value to compensate for the difference of the actual attitude of the sensor from the setpoint attitude of the sensor is ascertained and used; and/or an information item representing the change in content within the field of view is output.

5. The method as recited in claim 4, wherein a type and/or a degree of a difference of an actual attitude of the sensor from the setpoint attitude of sensor is ascertained based on the transform.

6. The method as recited in claim 4, wherein the difference of the actual attitude from the setpoint attitude of the sensor is:

ascertained based on a statistical comparison method, in which a distribution of the positional changes of the reference prototypes is compared to a predefined reference distribution; and/or ascertained based on low-pass filtering of the positional changes considered jointly a comparison of filtered difference values with at least one predefined threshold difference value.

7. The method as recited in claim 1, wherein:

during the ascertainment of the measuring points, only data, which represent the recordings and satisfy a predefined quality criteria, are considered; and/or in the method, only those of the measuring points are considered, which are linked to velocity data that each represent velocities lying below a predefined, velocity threshold.

8. The method as recited in claim 1, wherein the reference data set:

is generated based on a monitoring of the surroundings by the sensor in a predefined state of the sensor, and/or a simulation of the surroundings, and/or map data, and/or a sensor model; and/or is generated prior to execution of the method or during the execution of the method based on temporarily stored and/or preprocessed raw data of the sensor; and/or is used to adjust the initial attitude of the sensor.

9. The method as recited in claim 1, further comprising determining, by the processing system, a greatest one of the respective positional changes, wherein the ascertaining that the change has occurred to the field of view and/or to the environment is based on the determined greatest one of the respective positional changes.

10. The method as recited in claim 9, wherein the ascertaining that the change has occurred to the field of view and/or to the environment is further based on the statistical comparison of a distribution of the respective positional changes to a predefined reference distribution.

11. The method as recited in claim 1, further comprising determining, by the processing system, a greatest one of the respective positional changes, wherein the ascertaining that the change has occurred to the field of view and/or to the environment is based on a comparison of the determined greatest one of the respective positional changes to a predefined threshold.

12. The method as recited in claim 1, wherein the ascertaining that the change has occurred to the field of view and/or to the environment is based on a statistical comparison of a distribution of the respective positional changes to a predefined reference distribution.

13. The method as recited in claim 12, wherein the statistical comparison includes a Kolmogorov-Smirnov test.

14. The method as recited in claim 1, wherein the grouping is based on similarities of spatial coordinates of respective measuring points determined using the similarity metric.

15. The method as recited in claim 1, wherein the grouping is based on similarities of velocities of respective measuring points determined using the similarity metric.

16. The method as recited in claim 1, wherein the grouping is based on similarities of dimensions of respective measuring points determined using the similarity metric.

17. A stationary sensor system comprising:

a stationary sensor; and a processing system that includes at least one processor; and wherein, for self-monitoring a field of view of the stationary sensor while performing traffic control, the stationary sensor is configured to record surroundings of the sensor-at a plurality of different times within a predefined measuring time frame and the processing system is configured to:

ascertain, based on the recordings, measuring points representing positions and/or dimensions of objects in the surroundings of the sensor;

group the ascertained measuring points based on a predefined similarity metric so that each group of the measuring points is represented by a prototype identifying a respective object to which the respective group of the measuring points corresponds;

filter out moving objects to thereby retain a subset of the prototypes representing those of the objects that are stationary in the surroundings;

determine a transform that best fits the subset of prototypes to a stored reference set of reference prototypes that identify positions of stationary objects in a reference state of the sensor and surroundings and whose measuring points were ascertained in the reference state;

individually for each of the reference prototypes:

apply an inverse of the transform individually to the respective reference prototype; and determine a respective positional change of the respective reference prototype resulting from the inverse transform;

ascertain, based on the positional changes, that a change has occurred to the field of view of the sensor and/or to an environment that is within the field of the view of the sensor; and perform, by the processor system, a control of vehicular traffic in real time based on the ascertained change while the stationary sensor continues to monitor the surroundings.

18. A non-transitory machine-readable storage medium on which is stored a computer program that (a) is executable by a processing system of a stationary sensor system, the stationary sensor system including a stationary sensor that is configured to record surroundings of the sensor at a plurality of different times within a predefined measuring time frame, and (b) when executed by the processing system, causes the processing system to perform a method for self-monitoring a field of view of the stationary sensor while performing traffic control, the method comprising the following steps:

ascertaining, based on the recordings, measuring points representing positions and/or dimensions of objects in the surroundings of the sensor; grouping the ascertained measuring points based on a predefined similarity metric so that, each group of the measuring points is represented by a prototype identifying a respective object to which the respective group of the measuring points corresponds;

filtering out moving objects to thereby retain a subset of the prototypes representing those of the objects that are stationary in the surroundings;

determining a transform that best fits the subset of prototypes to a stored reference set of reference prototypes that identify positions of stationary objects in a reference state of the sensor and surroundings and whose measuring points were ascertained in the reference state;

individually for each of the reference prototypes:

applying an inverse of the transform individually to the respective reference prototype; and determining a respective positional change of the respective reference prototype resulting from the inverse transform;

ascertaining, based on the positional changes, that a change has occurred to the field of view of the sensor and/or to an environment that is within the field of the view of the sensor and performing a control of vehicular traffic in real time based on the ascertained change while the stationary sensor continues to monitor the surroundings.

\* \* \* \* \*